United States Patent
Pérez Soler et al.

(10) Patent No.: US 11,544,841 B2
(45) Date of Patent: Jan. 3, 2023

(54) METHOD OF DETERMINING THE COHERENCE BETWEEN A PHYSICAL OBJECT AND A NUMERICAL MODEL REPRESENTATIVE OF THE SHAPE OF A PHYSICAL OBJECT

(71) Applicant: INSTITUTO TECNOLÓGICO DE INFORMÁTICA, Valencia (ES)

(72) Inventors: Javier Pérez Soler, Valencia (ES); Alberto José Pérez Jiménez, Valencia (ES); Juan Carlos Pérez Cortés, Valencia (ES); José Luis Guardiola García, Valencia (ES)

(73) Assignee: INSTITUTO TECNOLÓGICO DE INFORMÁTICA

( * ) Notice: Subject to any disclaimer, the term of this patent is extended or adjusted under 35 U.S.C. 154(b) by 0 days.

(21) Appl. No.: 17/235,501

(22) Filed: Apr. 20, 2021

(65) Prior Publication Data
US 2021/0334948 A1  Oct. 28, 2021

(30) Foreign Application Priority Data

Apr. 22, 2020 (EP) .................................. 20382328

(51) Int. Cl.
*G06T 7/00* (2017.01)
*G06T 7/30* (2017.01)
(Continued)

(52) U.S. Cl.
CPC .............. *G06T 7/001* (2013.01); *G06T 7/344* (2017.01); *G06T 17/00* (2013.01); *H04N 5/247* (2013.01)

(58) Field of Classification Search
None
See application file for complete search history.

(56) References Cited

U.S. PATENT DOCUMENTS 8,767,011 B1 * 7/2014 Kornmann ............... G09G 5/00
345/623
2011/0007072 A1 * 1/2011 Khan ...................... G06T 7/564
345/420
(Continued)

FOREIGN PATENT DOCUMENTS

EP 2511653 A1 10/2012
EP 2561958 A1 2/2013

OTHER PUBLICATIONS

Novatni et al. "A geometric approach to 3D object comparison." Proceedings International Conference on Shape Modeling and Applications. IEEE, 2001 (Year: 2001).*
(Continued)

*Primary Examiner* — Saptarshi Mazumder
(74) *Attorney, Agent, or Firm* — Lerner, David, Littenberg, Krumholz & Mentlik, LLP

(57) ABSTRACT

The present invention relates to a method of determining the coherence between a physical object and a numerical model representative of the shape of a physical object, wherein a specific use of the method according to the invention is assessing and quantifying manufacturing defects. The method is characterized by a set of steps comprising: capturing multiple images of the physical object; processing the images to produce a second numerical model of the physical object; in a computer, aligning the first numerical model and the second numerical model to generate a third numerical model according to specific sub-steps, wherein the third numerical model comprises a plurality of points representative of the shape of the captured physical object. Compared with the first numerical model, the third numerical model allows determining a measurement of the coherence between the physical object captured by means of images and the first numerical model representative thereof.

20 Claims, 6 Drawing Sheets

(51) Int. Cl.
    *G06T 7/33* (2017.01)
    *G06T 17/00* (2006.01)
    *H04N 5/247* (2006.01)

(56) References Cited

U.S. PATENT DOCUMENTS

| | | |
|---|---|---|
| 2015/0371432 A1 | 12/2015 | Medioni et al. |
| 2019/0132529 A1* | 5/2019 | Ito .................. H04N 7/181 |
| 2019/0228563 A1* | 7/2019 | Maeda .............. G06T 15/40 |

OTHER PUBLICATIONS

Osada, et al. "Matching 3D models with shape distributions." Proceedings international conference on shape modeling and applications. IEEE, 2001. (Year: 2001).*

Extended European Search Report for Application No. 20382328.1, dated Oct. 15, 2020, 8 pages.

Mein Han et al: "Creating 3D Models with Uncalibrated Cameras"; IEEE Xplore, Oct. 1, 2000 (Oct. 1, 2000), pp. 178-1985.

Michael Zollhofer et al: "State of the Art on 3D Reconstruction with RGB-D Cameras" Computer Graphics Forum : Journal of the European Association for Computer Graphics, vol. 37, No. 2, May 1, 2018.

* cited by examiner

METHOD OF DETERMINING THE COHERENCE BETWEEN A PHYSICAL OBJECT AND A NUMERICAL MODEL REPRESENTATIVE OF THE SHAPE OF A PHYSICAL OBJECT

CROSS REFERENCE TO RELATED APPLICATIONS

The present application claims the benefit of and priority to EP Application No. 20382328.1, filed in Spanish on Apr. 22, 2020, the entire disclosure of which is incorporated by reference herein.

OBJECT OF THE INVENTION

The present invention relates to a method of determining the coherence between a physical object and a numerical model representative of the shape of a physical object. This numerical model representative of the shape will be identified as first representative numerical model throughout this description.

Merely by way of example, the first numerical model representative of the shape is a CAD model used for designing a specific physical object that is later manufactured. After manufacture, the method according to the invention allows comparing each of said manufactured physical objects by evaluating the coherence of their shape features with the CAD model used in their design.

A specific use of the method according to the invention is assessing and quantifying manufacturing defects.

The method is characterized by a set of steps comprising: capturing multiple images of the physical object; processing the images to produce a second numerical model of the physical object; in a computer, aligning the first numerical model and the second numerical model to generate a third numerical model according to specific sub-steps, wherein the third numerical model comprises a plurality of points representative of the shape of the captured physical object.

Compared with the first numerical model, the third numerical model allows determining a measurement of the coherence between the physical object captured by means of images and the first numerical model representative thereof.

BACKGROUND OF THE INVENTION

One of the fields of the art that has been the most intensely developed is the field of the reconstruction of three-dimensional shapes of an object or a scene from photographic images capturing said object or scene from different viewpoints.

European patent no. EP2511653 which describes the use of a plurality of image sensors distributed around an image capture space is known, wherein the system is furthermore configured to allow the free fall of the object through the capture space in such a way that there is no holding or supporting element hiding part of the object.

The plurality of image sensors thereby capture a plurality of images which are subsequently processed for carrying out a reconstruction of the shape of the object from said plurality of images corresponding to different viewpoints of the object.

The fact that the object is captured in free fall means that there are no areas that the camera cannot access. Nevertheless, even under these conditions there are areas of the object that may not be captured by any of the image sensors, for example, cavities without outward openings or some concave areas.

As a result of configurations of this type where part of the object is not suitably captured by the image sensors, subsequent processing of the images gives rise to numerical models representing shapes with object reconstruction errors because they assume that the inaccessible parts are not empty.

The present invention relates to a method of determining the coherence between a physical object and a first numerical model representative of the shape of said physical object in which there is a phase of reconstructing the shape of the object which allows determining optimal points of said object best defining its shape by committing minimal error. This better reconstruction is characterized by a step in which the determination of the optimal points is established by combining all the information provided by the first numerical model.

DESCRIPTION OF THE INVENTION

The present invention relates to a method of determining the coherence between a physical object and a numerical model representative of the shape of said physical object, wherein this numerical model representative of the shape will be identified as first numerical model throughout the description.

Numerical model will be interpreted as any model representative of a physical object constructed with computational means. The numerical model is instantiated in said computational means by using specific data structures at least with information about the shape of the object. The numerical model itself may incorporate additional information, for example with attributes of the object.

Examples of information about the shape of the object are: specific structures defining all or part of the outer surface of the object, specific points positioned on the outer surface of the represented object, information about the manner in which one or more of the preceding elements are connected, if they are connected, etc.

In the preferred exemplary implementation of a numerical model, the information defining the shape of the object comprises three-dimensional point coordinates in a computational space. That is, the non-physical object represented by means of the numerical model can be moved and oriented in the computational space for example to make it correspond with another non-physical object represented by means of another numerical model, where both numerical models can be implemented by using different data structures.

The physical object can be measured, oriented in physical space, and captured by means of image sensors. The coordinates associated with each point of the physical object will be referenced according to a physical reference system. Once the reconstruction of a numerical model of the object has been carried out from the information captured by means of a plurality of image sensors, the object is represented in a computational space which may in turn be referenced with respect to the physical space.

Likewise, image sensor, or simply sensor when referring to the sensor of a camera, will be interpreted as a matrix sensor formed by pixels capable of sensing the light that reaches it, generating an image that can be manipulated by a computational device.

In this description a distinction is made between image sensor and camera. The camera is a device intended for capturing images comprising a lens and an image sensor. The lens is adapted for focusing an image on the image sensor with a focal point positioned on the optical axis of the lens.

According to this configuration, the image sensor is interposed between the lens and the focal point such that, given a point in physical space positioned in a region within the field of depth established by the lens and shown in a pixel of the image, there are three points aligned in the physical space according to a line: the point in physical space captured by the pixel, the point in physical space where said pixel is located knowing the camera specifications and particularly the position and orientation of the image sensor, and the position in physical space of the focal point also knowing the camera specifications.

Considering the interpretation of these terms, the invention relates to a method of determining the coherence between a physical object and a numerical model representative of the shape of a physical object, wherein the method uses:

a plurality of cameras
  wherein each camera comprises a sensor and a lens for focusing an image on the sensor, such that the lens is configured with a focal point that is pre-established and positioned on the optical axis of the lens, and wherein the cameras of the plurality of cameras are spatially distributed such that the optical axes of said cameras are oriented towards a capture region;
means for positioning the physical object in the capture region;
a central processing unit, in communication at least with the plurality of cameras and with the means for positioning the physical object.

The method uses a plurality of cameras oriented towards a region in which the physical object is positioned in a given instant. This region is identified as a capture region because it is the region in respect of which the plurality of cameras are oriented for capturing at least part of the object when said object is positioned in said region.

The spatial distribution of the cameras allows capturing images of the object which is positioned in the capture region from different viewpoints. According to a preferred example of the invention, the plurality of cameras is evenly distributed in the space around the capture region, and more specifically according to a distribution on a spherical surface.

The means for positioning the physical object in the capture region are such that they position the physical object in the capture region in the moment in which each of the cameras captures an image simultaneously.

It is highly recommended that these means for positioning the physical object in the capture region do not appear in the images and cover said physical object as little as possible.

According to a preferred example, these means for positioning the object either let the object fall in free fall such that the physical object passes through the capture region, or else they are configured to launch the physical object in an upward movement from a lower position and for the object to reach the capture region.

Among the means used by the invention there is a central processing unit which, according to an embodiment, can be formed in turn by several microprocessors configuring a system, in communication with the means for positioning the physical object in the capture region and with the plurality of cameras. In particular, the central processing unit is capable of positioning the physical object in the capture region and, in the moment in which the physical object can be captured in said region, activating the cameras to acquire an image of the object.

The method comprises the following steps:

a) providing a first numerical model wherein said first numerical model is a numerical model representative of the shape of a physical object.

The numerical model is identified in this description as the first numerical model and it is a representation of the shape of the physical object which will be examined by means of image capture. The fact the numerical model is identified as a model representative of the shape of the physical object is because the numerical model is a theoretical shape of the physical object, where a theoretical shape is interpreted as the shape describing by means of mathematical entities the shape of the object.

An example of a theoretical shape is a cube where the faces are formed by perfectly parallel and smooth plains as well as edges with zero corner radius. Any physical object formed by a real, specific material is unable to reproduce this theoretical shape, but a wooden cube, with dimensional, flatness, or parallelism defects, or with a texture characteristic of wood, may likewise be represented by a cube defined by means of mathematical entities which may in turn be instantiated in a computer with specific data structures.

b) ordering the means for positioning the physical object to position the physical object in the common capture region, and ordering the plurality of cameras to capture an image of the physical object by means of each of said cameras;

c) generating a second numerical model of the object from the plurality of captured images and by means of a silhouette technique.

The capture of a plurality of images, one for each camera, is carried out in these steps such that there are images of the object with a different viewpoint. The method of the silhouette technique is known for generating a numerical model describing an approximate shape of the observed object.

According to a preferred example, the silhouette technique first carries out a silhouetting operation by demarcating the object captured in each image. The silhouette in each image is a curve formed by a plurality of pixels enclosing the captured object. Each pixel of the silhouette and the focal point of the camera allow determining a line in physical space which is tangent at a point or in a line segment belonging to the object captured by means of that camera. The plurality of pixels of the silhouette therefore define a bundle of lines starting from the focal point, and by connecting each pair of lines with a flat surface, a conical surface is constructed. A conical volume is in turn demarcated within the conical surface.

In this case, conical surface is understood according to its most general meaning, where said conical surface is the ruled surface consisting of directrix, i.e., lines passing through the focal point, and generatrix, i.e., the curve of the silhouette which is a section of the conical surface. That is, each directrix passes through the focal point and rests at a point of the curved generatrix.

Each image gives rise to a conical volume, and the intersection of all the conical volumes determined by the plurality of cameras gives rise to a volume which approximates the captured physical object. The relative position of the plurality of cameras must be known in order to know, in the physical space of the capture region, the position of the images captured, the position of each focal point, and thus obtain the approximate volume of the physical object.

In particular, the shape of the resulting volume reconstructed by the silhouette technique is a volume demarcated by the visual hull. For example, flat surfaces that are not parallel to any line of any bundle extending from the focal points of the cameras will be hidden beyond the silhouettes and will give rise to an additional volume that is not present in the physical object.

d) aligning the first numerical model and the second numerical model in the computational space.

At this point, the method has two numerical models, the first being representative of the physical object and the second numerical model being reconstructed from the images. Both are represented computationally such that one can be moved with respect to the other. It is also possible to make changes in orientation of one with respect to the other. Aligning the first numerical model and the second numerical model in the computational space is to be interpreted as one of the models being displaced and turned in space until finding the highest correspondence between them.

The expression "highest correspondence" is interpreted as the application of a metric which allows measuring distances between the object represented by the first numerical model and the object represented by the second numerical model by establishing the position and orientation such that they make said metric minimal. The metric does not have to be unique and is pre-established. It is possible to associate a given metric, such as the Euclidean metric for example, to each rule. The metric can likewise be used to measure distances between points, between point and surface, or between surfaces.

The two numerical models appear under the condition of alignment for adopting the best fit of one in the other.

e) generating a third numerical model by means of a plurality of optimal points wherein each optimal point is the result of a selection from a plurality of points wherein:

the plurality of points with respect to which the selection is made belongs to a conical surface demarcating a conical volume, the selected optimal point or points meet a pre-established condition of proximity with the surface of the volume of the first model.

In this step, information furnished by the first numerical model is used to establish optimal points of the second numerical model such that these points are what generate the third numerical model.

That is, the third numerical model is formed by a plurality of points identified as optimal points.

Each of the conical surfaces contributes by furnishing to the third numerical model one or more optimal points. Those points which meet a condition of proximity with the volume of the first model, that is, with the surfaces demarcating it, are determined for each conical surface.

The result is the third numerical model which is formed by a plurality of points representative of the demarcating surface of the captured physical object and will allow determining the degree of coherence between the physical object and the first numerical model.

f) providing a measurement value of coherence, based on a pre-established metric, by taking the measurement between the third numerical model and the first numerical model.

The metric used to establish the degree of coherence does not have to be the same as the one used in the alignment step, that is, step d).

It should be indicated that steps a) and b) can be carried out in any order.

According to an embodiment of the invention, the second numerical model is generated from the plurality of captured images such that said second numerical model of the object numerically represents a volume V in a computational space, where $V = \cap_{i=1}^{N} Cn_i$, wherein $Cn_i$ is the conical volume defined with the vertex in the point in space where the focal point $F_i$ of the camera $C_i$ is positioned and demarcated by the ruled surface formed by connecting lines which connect the focal point $F_i$ of the camera $C_i$ and each point in space of the sensor $S_i$ corresponding to the silhouette of the physical object represented in the image $I_i$ captured by said sensor $S_i$.

This embodiment of the silhouetting method has been described considering a sensor formed by a matrix of pixels which capture the image and particularly the silhouette. The silhouette forms conical surfaces, considering conical surface according to its general meaning, and the resulting volume is configured as an intersection of all the conical surfaces.

When "the point in space of the sensor $S_i$" is indicated, it is to be interpreted as the sensor, given the position and orientation of the camera in space, being able to determine the position in the physical space of each of the pixels of the sensor which the camera comprises. This position and also the position in the physical space of the focal point, is what allows establishing the line extending to at least one point determined by the pixel as corresponding to the silhouette of the object under the viewpoint of the camera.

According to an embodiment, the plurality of points with respect to which the selection is made in the generation of the third numerical model is determined according to the following steps:

for each sensor $S_i$, i=1 . . . N determining one or more line segments belonging to a line passing through the focal point $F_i$ of the sensor $S_i$, and wherein said line segments are at least contained in a portion of the demarcating conical surface of the conical volume $Cn_i$;

for each line segment, selecting a plurality of points of said line segment which belong to the demarcating surface of the volume $Cn_i \cap V$.

Each conical surface $Cn_i$ generated from an image and referenced with respect to the physical space, is defined by a bundle of lines passing through the focal point $F_i$. Each of those lines contacts the physical object either at a point or at a line segment, or even at several line segments if part of the surface of the object is parallel to the line of the bundle under consideration.

The intersection of the conical surface with the volume demarcated by all the conical surfaces is another surface and is denoted as $Cn_i \cap V$. The points with respect to which the final selection is made verify being contained in the line segments which in turn are contained in this surface $Cn_i \cap V$.

Among all the possible points in respect of which the selection can be made, the optimal points are determined under a condition of proximity. According to an embodiment, the condition of proximity to be applied on a plurality of points for determining those which are optimal points in the generation of the third numerical model is determined by selecting that point or those points which meet the condition of minimum distance to the surface of the first numerical model.

According to one embodiment, the third numerical model is generated by making a selection of optimal points from a plurality of points determined for each of the sensors $S_i$, i=1 . . . N from the plurality of sensors S.

That is, each sensor furnishes one or more points which contribute to defining the third numerical model.

According to a preferred example of the invention, the cameras are evenly distributed according to a spherical surface, and wherein the common capture region (Reg) is located in the center of said spherical surface.

According to one embodiment, the invention is used to identify the best first numerical model, from a plurality of first numerical models, which explains the third numerical model obtained. According to this embodiment, for a plurality of first different reference numerical models, steps a) and d) to f) are carried out for each of the first numerical models and the third numerical model by establishing the first numerical model verifying the best measurement of coherence in step f) and by determining that said first numerical model is the one having the greatest coherence with respect to the physical object.

According to this method, automation is achieved in the identification of the physical object which is captured and the second numerical model generated a first time by means of steps b) and c) is utilized in the remaining comparisons with the first numerical model.

This specific method allows examining a set of parts from a pre-established set modeled through a first numerical model. The method examines the degree of closeness through the metric measured in step f) of the object captured with each of the first numerical models, so the closest first numerical model is the one which is determined as corresponding with the examined physical object. This step is automatic and does not require manual pre-selection by the user.

One of the advantages of this automatic selection is that it can be included in a production process in which there are a plurality of types of parts, that is, the physical objects, at the outlet thereof which are examined without the need of having to first separate each part into a different outlet.

According to the preceding embodiment, to control when none of the first numerical models corresponds with the object that is actually captured, a threshold limit or value may be defined and used to establish that if the degree of closeness is below said limit, the method will not select a model that presents the highest degree of closeness from the first numerical models as the closest model, since none of the first numerical models would comply with the minimum degree of closeness.

Another object of this invention relates to the device for determining the coherence between a physical object (O) and a numerical model representative of the shape of said physical object according to claim 8, as well as a product consisting of a computer program comprising instructions such that when the program is executed by a computer, they cause the computer to carry out a method according to steps a) to f) according to any of the described embodiments.

DESCRIPTION OF THE DRAWINGS

These and other features and advantages of the invention will become more apparent from the following detailed description of a preferred embodiment, given solely by way of illustrative, non-limiting example, in reference to the attached figures.

DETAILED DISCLOSURE OF THE INVENTION

According to the first inventive aspect, the present invention relates to a method which allows determining the coherence between a physical object (O) and a numerical model representative of the shape of said physical object (O). This numerical model representative of the shape will be identified as first numerical model (MRef).

A practical usage example of the first numerical model (MRef) representative of the shape of the physical object (O) is the design by means of the computer-aided design (CAD) of a specific physical object (O), for example a part to be manufactured by means of numerically controlled machining centers.

Once the part is manufactured, it has geometric features of the first numerical model (MRef) since it was used to define each of the shape aspects of the physical object (O) and, also features characteristic of the manufacturing process, such as textures characteristic of the machining process, flatness and parallelism errors, and other possible manufacturing defects.

According to the preferred example of carrying out the invention, the first numerical model (MRef) is instantiated in a computer and comprises a data structure with geometric entities such as points, lines, planes, curves, parameterized surfaces, etc., mathematic equations defining specific relations and conditions about the geometric entities, information about the position and orientation in space with respect to a pre-established reference, etc., being able to comprise one or more of the previously mentioned elements.

The first numerical model (MRef) is defined by a user and there is a correspondence between the first numerical model (MRef) and the physical object (O). This correspondence may be the one indicated above, that is, the physical object (O) is the result of a manufacturing process according to the first numerical model (MRef), or the opposite relation can also be established, that is, a physical object (O) is subsequently modeled by means of a numerical model coming to be identified as first numerical model (MRef).

The preferred exemplary embodiment of the invention uses a plurality of N cameras ($C_i$) with i=1 . . . N being the index which allows identifying each of the cameras.

Figure 1:
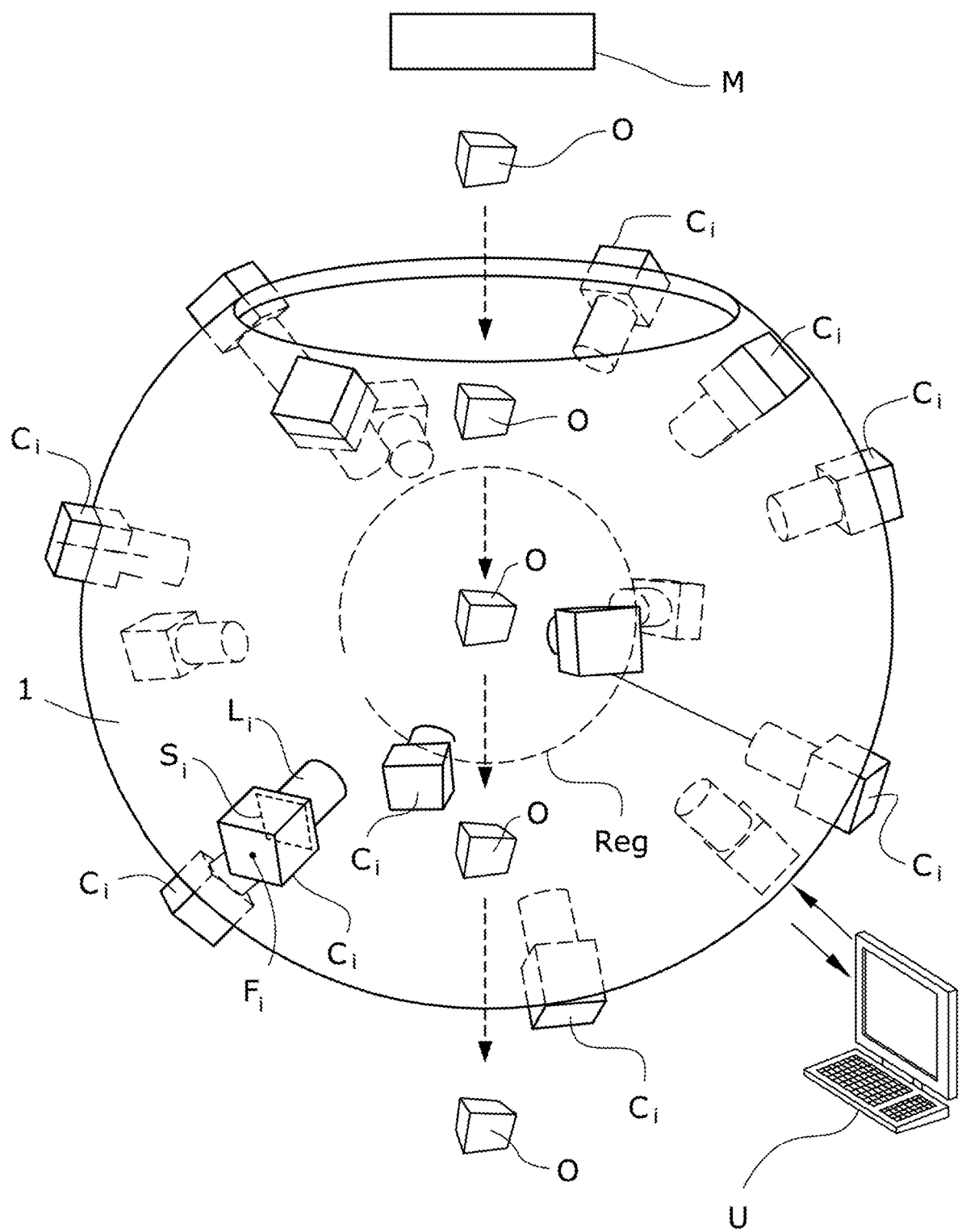
FIG. 1 This figure schematically shows an embodiment of an image capture device and a device for the subsequent processing thereof which allows carrying out a specific mode of the invention.

FIG. 1 shows a spherically configured structure (1) in respect of which each of the N cameras ($C_i$) is installed, wherein an equidistant distribution has been chosen in this embodiment. Each camera ($C_i$) is fixed to the structure (1) oriented towards the interior thereof such that the plurality of cameras ($C_i$) has the optical axis thereof oriented towards a capture region (Reg). In this embodiment, the capture region (Reg) is positioned in the center of the spherically configured structure (1) and within the depth of field of each of the cameras ($C_i$).

Figure 2:
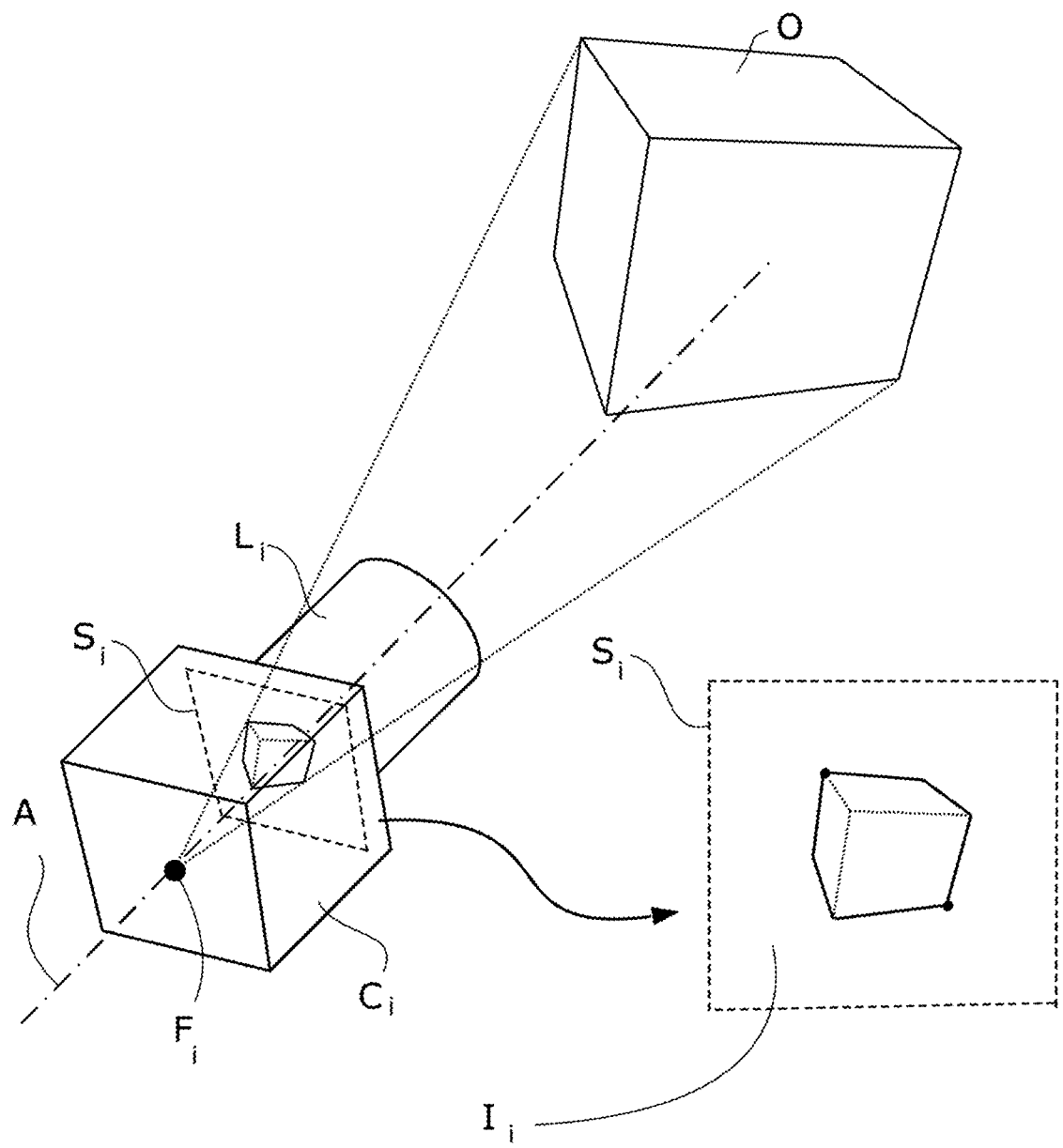
FIG. 2 This figure schematically shows a detail of one of the cameras, the most relevant parameters and components, as well as the obtained image shown as a separate detail.

FIG. 2 shows how each of the cameras ($C_i$) comprises a sensor ($S_i$) and a lens ($L_i$) for focusing an image ($I_i$) on the sensor ($S_i$), such that the lens ($L_i$) is configured with a focal point ($F_i$) that is pre-established and positioned on the optical axis (A) of the lens ($L_i$). In this embodiment, the sensor ($S_i$) is a matrix sensor formed by light-sensitive pixels such that the lens ($L_i$) focuses the image ($I_i$) on the surface of the sensor ($S_i$) which is captured and can be subsequently processed by a central processing unit (U).

If a pixel of the image ($I_i$) shows a specific point of a physical object (O) positioned in the capture region (Reg), considering a coordinate system in which the positions of any point in space where the cameras are located are expressed, it is verified that the focal point ($F_i$) of the camera ($C_i$) that captured the image ($I_1$), aligned with the spatial position of the pixel in the sensor ($S_i$) housed in the camera ($C_i$), defines a line intersecting the point of the physical object (O) that gave rise to the pixel of the image in which said point of the physical object (O) is represented. This correspondence is shown in FIG. 2 by means of two points of the boundary of the silhouette, the outermost ones of the image, with the points of the object and connected by means of discontinuous lines. The positions of the pixels giving rise to those two lines are shown in the image by means of large solid points.

The device used in this method, according to the preferred example of the invention and shown in FIG. 1, comprises means for positioning (M) the physical object (O) in the capture region (Reg). In this embodiment, the structure (1) has an opening in the top part and an opening in the bottom part such that the physical object (O) can go through both openings in free fall, passing through the capture region (Reg). The means for positioning (M) the physical object (O) in the capture region (Reg) at least comprise elements that let the physical object (O) fall appropriately in order to track this path passing through the capture region (Reg). The advantage of this type of means for positioning (M) the physical object (O) in the capture region (Reg) by free fall is that the physical object (O) does not have any outer surfaces covered by a support such that they can all be visually accessible for the cameras surrounding the capture region (Reg).

Other alternative means that allow positioning the physical object (O) in the capture region (Reg) would be a launcher which is positioned in the bottom part of the structure (1) and launches the object until positioning it in the capture region (Reg). The advantage of this second option is that either the point of change in direction is in the capture region (Reg), achieving that the velocity is zero in one instant, preventing the images from being blurry, or is positioned slightly higher, allowing the physical object to be positioned in the capture region (Reg) twice with a low rate of travel.

According to the preferred example of the invention, the device used comprises a central processing unit (U), in communication at least with the plurality of cameras ($C_i$) i=1 . . . N and with the means for positioning (M) the physical object (O) such that they can activate the means for positioning (M) the physical object (O), positioning it in the capture region (Reg) and, in this moment, activating all the cameras ($C_i$) simultaneously, with i=1 . . . N, providing a plurality of images ($I_i$), up to N if they are all valid, of the physical object (O) from different viewpoints and orientations.

The central processing unit (U) may consist of a single physical unit or of two or more physical units distributed for example with individual units specializing in specific functions, for example dedicated to image processing, the actuation of physical elements, the communication and distribution of data, etc. For any of these examples, the use of the term central processing unit (U) will be valid.

Once the physical object (O) is positioned in the capture region (Reg) and captured by the plurality of cameras ($C_i$), the central processing unit (U) receives a plurality of images ($I_i$), wherein each image $I_i$ has associated therewith information about the intrinsic parameters of the camera $C_i$ that captured it, such as the focal point ($F_i$), lens specifications, the position and orientation of the camera $C_i$ in space, etc.

A second numerical model of the object (R) is generated from the plurality of images ($I_i$), not necessarily the captured N, by means of the silhouette technique. According to this technique.

If a specific camera $C_i$ for a specific i captures the entire physical object (O), there will be in the image $I_i$ generated by said camera $C_i$ a set of pixels corresponding to the object and, in the area around same, a set of pixels showing the surrounding space around the object. Although that is the preferred example, the invention still works when one or more cameras capture the object partially, provided that the image contains one part corresponding to the object and another part corresponding to the surrounding space.

To achieve this condition, the physical object (O) must be positioned in the capture region (Reg) in the moment of the capture, and the depth of field of each of the cameras $C_i$ must be sufficient so as to cover the entire visible part of the physical object (O).

Figure 3:
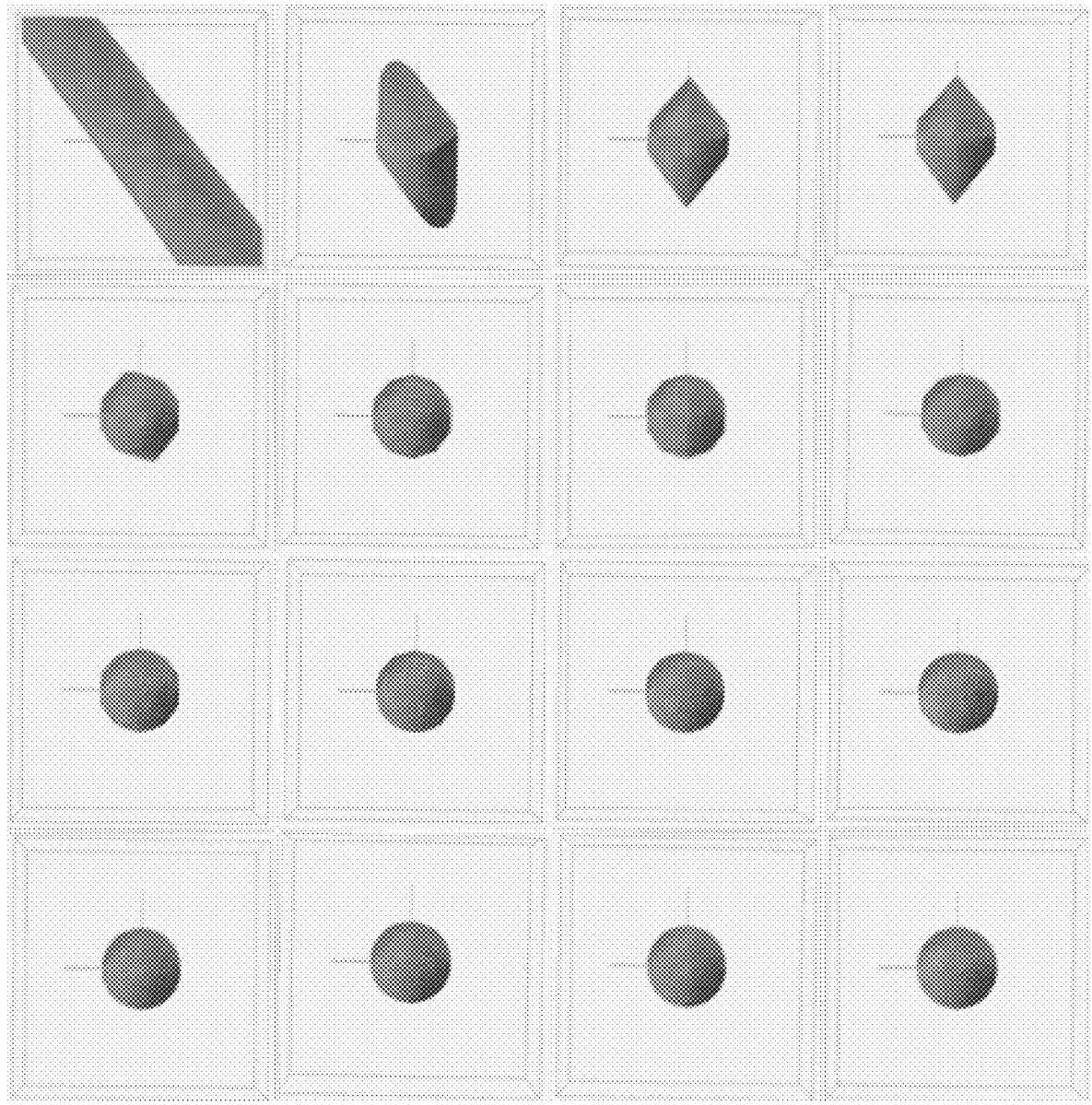
FIG. 3 This figure shows a sequence of images in the generation of the second numerical model from a first image, a second image, and so on and so forth until using the information of all the images that captured the physical object.

FIG. 3 shows a sequence of images in the generation of the second numerical model (R) from a first image, a second image, and so on and so forth until using the information of all the images that captured the physical object (O).

A curve demarcating the object is provided with the pixels of the first image $I_1$ corresponding to the boundary between the region of pixels representing the object and the region of pixels representing the surrounding space. In FIG. 2, the curve is closed and corresponds to the boundary which is shown as a solid line and the remaining lines are shown as discontinuous although visible lines. This process can be carried out with any of the known thresholding algorithms or others which allow distinguishing the object from the background.

A specific way of determining a boundary point is by determining the point of the image sensor $S_i$ positioned between two pixels or discrete units of said image sensor $S_i$ which are adjacent in the space of the image and where one of them is part of the object and the other one is not.

Lines defined by two points, the spatial coordinates of the boundary pixel when it is positioned in the sensor $S_1$ that captured it, and the focal point $F_1$ of the corresponding camera $C_1$ are defined with each of these boundary pixels. These lines form a bundle of lines passing through the focal point $F_1$ and resting on the boundary curve demarcating the object such that they demarcate a conical volume $Cn_1$ with the vertex being the focal point $F_1$. This conical volume $Cn_1$ does not have to correspond to a circular cone but rather its most general meaning, wherein the directrix on which the bundle of generatrix lines passing through the focal point $F_1$ rests is a curve, the boundary curve.

Each of the conical volumes $Cn_i$ thus defined are infinite and have no base demarcating them, but that is not the case with the volume resulting from the intersection of all the conical volumes, which is indeed finite.

The sequence shown in FIG. 3 represents in the top left part the conical volume $Cn_1$ in which, while it may be infinite, only one of its parts is observed, and to the right of that the intersection of this conical volume $Cn_1$ with the next one $Cn_2$, which can be denoted as $Cn_1 \cap Cn_2$. The sequence of intersections $\cap Cn_i$ with i=1 . . . N is shown from left to right in each of the rows from the first to the last row. The case which is shown is the result of combining all the information from 16 cameras, that is N=16.

The precision of the second numerical model (R) thus generated by means of silhouettes depends on the number of cameras, the more cameras, the more precise, and on the orientation of the object with respect said cameras. In the limit case where N→∞, the volume defined by the second numerical model (R) is identified in the literature as the visual hull of the physical object (O).

Figure 4A:
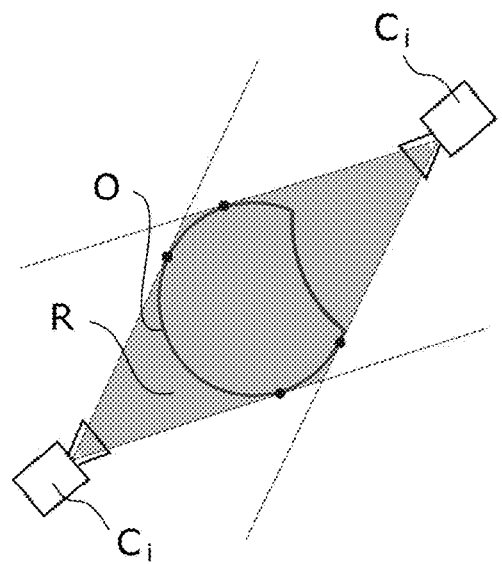
FIGS. 4A and 4B These figures show a simple example in two dimensions of an object captured by two and four cameras, respectively, wherein the shaded area represents the volume demarcated by the intersection of two areas.

FIG. 4A shows a very simple example in two dimensions of an object captured by two cameras, where the shaded area represents the volume demarcated by the intersection of two areas.

Each of the areas is the projection in two dimensions of the conical volume $Cn_i$ and it now has a triangle shape not limited on one of its sides, limited only by two lines starting from the focal point of the camera $C_i$.

The points of intersection between the line and the physical object (O) are the points which give rise to the boundary pixel in the image captured by the camera and allow defining the line from the focal point $F_i$ to said point to generate each conical volume $Cn_i$.

Figure 4B:
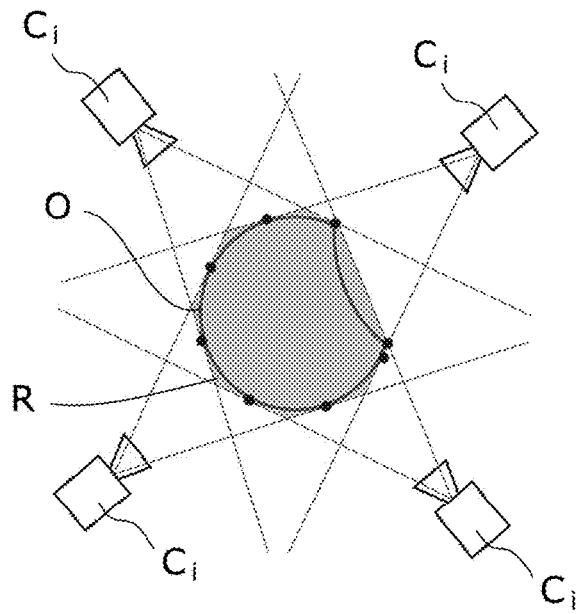

FIG. 4B shows the same example, adding two further cameras, wherein the volume determined by silhouetting is now cut off from the focal points of the first two cameras $Cn_i$ i=1, 2, and therefore said, also shaded volume corresponding to the second numerical model (R) adheres to a higher degree to the shape of the physical object (O).

Said FIG. 4B clearly shows how this method of generating the second numerical model (R) in the two-dimensional case gives rise to volumes demarcated by convex surfaces since the volume is always greater and is incapable of reproducing recesses such as the curved recess which is shown oriented towards the right of the figure.

Figure 5A:
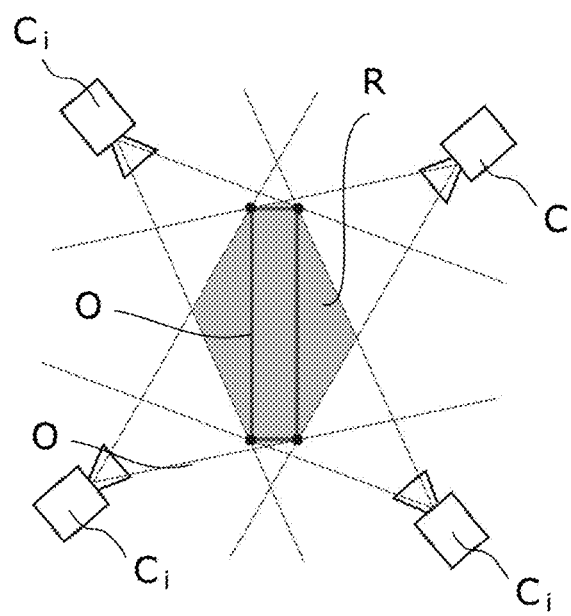
FIGS. 5A and 5B These figures show the same process as that shown in FIGS. 4A and 4B by using four cameras and with an object having a rectangular shape in two dimensions.
Figure 5B:
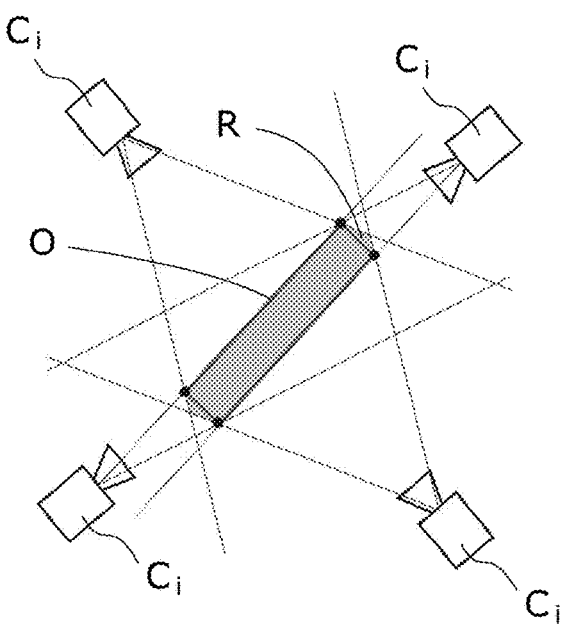

FIGS. 5A and 5B show the same process using four cameras $C_i$ i=1, . . . , 4 and with an object shown to be rectangular in two dimensions. FIG. 5A has an orientation in which the bundles of lines intersecting on the periphery are not parallel to the larger sides of the rectangle, whereas in FIG. 5B each of the larger sides of the rectangle is parallel to one of the lines of the bundles of lines demarcating the volume corresponding to the second numerical model (R).

The strong influence of the configuration of the reconstruction system as well as the shape of the physical object (O) on the accuracy of the volume reconstructed by means of the second numerical model (R) can thereby be observed. This is the main problem solved by the method of the invention herein described by means of a specific example.

The following step of the process carries out the alignment of the first numerical model (MRef) and the second numerical model (R) such that one is displaced and turned until the distance between one numerical model (MRef) and the other numerical model (R) is minimal. That is, the movements allowed in the alignment process are only translational and rotational movements, such that the objects represented by the first numerical model (MRef) and the second numerical model (R) are not subject to deformations.

Given that the first numerical model (MRef) and the second numerical model (R) are computational models instantiated in a computer, the alignment is carried out in said computer.

The distance between the first numerical model (MRef) and the second numerical model (R) is established by predefining a first metric. An example of a metric is the one defined from the Euclidean rule, and the alignment criterion is one that verifies that the distance from all the points of the second numerical model (R) to the first numerical model (MRef) is minimal.

It can be observed how many points of the volume reconstructed by means of silhouettes, the second numerical model (R), do not belong to the physical object (O). According to the invention, the next step transfers information from the first numerical model (MRef) to the second numerical model (R) in a specific way to give rise to a third numerical model (MOpt) defined by means of a plurality of points and approximating to a higher degree the configuration of the physical object (O).

Not all the points within the bundle of points generated from the boundary points and giving rise to the conical surface $Cn_i$, for each line, belong to the object. According to this preferred exemplary embodiment for each of these lines a point is selected as the point of the physical object (O) and it is selected under the criterion of being the one having the shortest distance with respect to the first numerical model (MRef). Not having erroneous point is thereby assured. The measurement of this second distance is carried out by pre-establishing a second metric which may be different from the first metric.

The points of the line are actually points of the surface demarcating the conical surface $Cn_i$ for a specific sensor $S_i$. Of said conical surface $Cn_i$, only the points verified as being in the intersection between said surface $Cn_i$ and the demarcating surface of the volume corresponding to the second numerical model (R) which can be expressed as $V = \cap_{i=1}^{N} Cn_i$ are selected as possible candidates for the third numerical model (MOpt).

Within this sub-selection of points of each conical surface $Cn_i$, the selected points of the third numerical model (MOpt) are those which meet a condition of proximity with the surface of the first numerical model (MRef). The Euclidean distance has also been used in this embodiment.

A preferred example is considered to be one wherein the first metric used in the alignment of the first numerical model (MRef) and the second numerical model (R) and the second metric for carrying out the selection of points of the third numerical model (MOpt) minimizing the distance to the first numerical model (MRef) are identical.

Once this selection is carried out for all the conical surfaces $Cn_i$ with i=1, . . . , N, the joint connection of all the selected points gives rise to the third numerical model (MOpt).

It is possible for a line of the bundle of lines generated by a boundary curve to touch more than one point of the physical object (O), or even infinite points if it is aligned with a straight part of the physical object (O) and coincides with a part of the first aligned numerical model (MRef). In this specific case, the point chosen by the method from among said points is irrelevant since the error committed in any case is nil or zero, and therefore the measurement continues to be a valid minimum.

Figure 6:
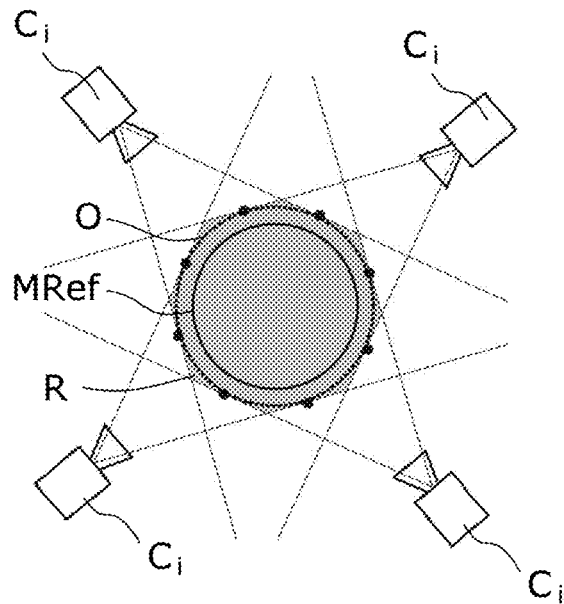
FIGS. 6 to 9 These figures show examples in two dimensions of a circular and rectangular configuration, wherein a solid line shows the first numerical model and the discontinuous line shows the object.

FIG. 6 shows a reconstruction by silhouettes, by means of a shaded region, of an object having a circular configuration (the two-dimensional version of a sphere), of a physical object (O) represented by means of discontinuous line, and the selected points shown as discs with a small diameter. Likewise, the first numerical model (MRef) is superimposed in the figure, represented in a discontinuous line and also showing a circular configuration, in a solid line, which is slightly smaller or has a smaller diameter.

Figure 7:
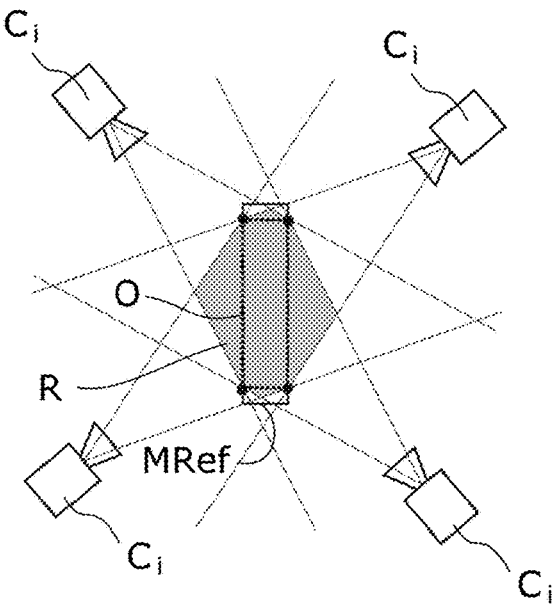

The same is shown in FIG. 7, wherein both the physical object (O) and the first numerical model (MRef), following this simple example in two dimensions, is a rectangle.

Figure 8:
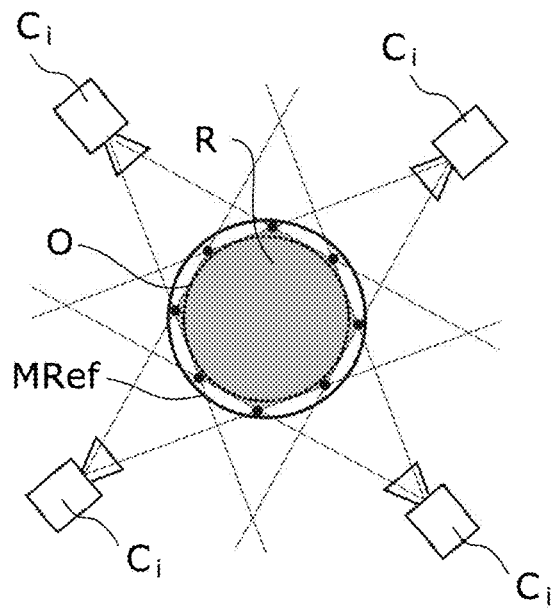
Figure 9:
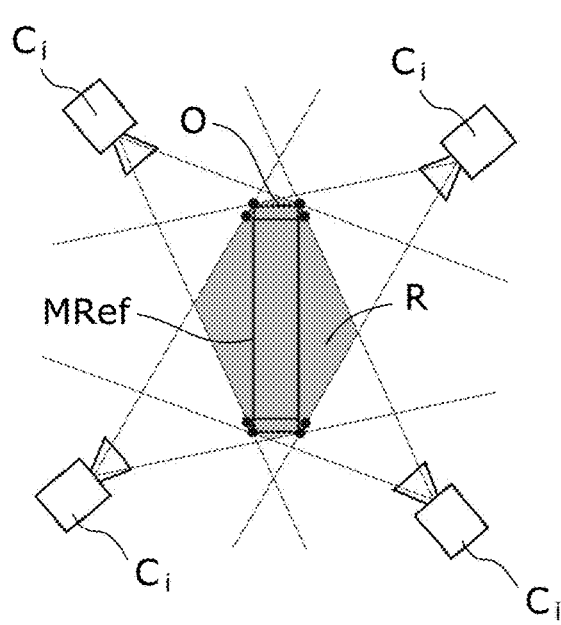

In these two examples, it can be observed how, according to the method, the points of the second numerical model (R) closest to the first numerical model (MRef) which are optimal and furthermore positioned in locations representative of the physical object (O) are selected, and wherein a measurement of the error is estimated by using a Euclidean metric. This metric may not be optimal, depending on the problem. This is the example of FIGS. 8 and 9, wherein the same shapes reconstructed through the second numerical model (R) give rise to points which minimize the error function for the physical object (O), but it can be observed that the selected points are located away from the physical object (O), in the case of FIG. 6, because the size of the first numerical model (MRef) is slightly larger than the second numerical model (R), whereas in FIG. 9 the opposite occurs, that is, the first numerical model (MRef) is slightly smaller than the second numerical model (R).

In these cases shown in FIGS. 6, 7, 8, and 9, only two points of the second numerical model (R) are selected per sensor ($S_i$) due to the particularity of silhouettes on two-dimensional figures which, for a single physical object (O), contain only two boundary points, the one demarcating the angle of aperture whereby the physical object (O) is observed.

For this reason, the selection of points selected to be part of the third numerical model (MOpt) is limited to the number of sensors ($S_i$); however, in the case of three dimensions, the number of boundary points is determined by the size of the physical object (O) and the density of points available in the sensors ($S_i$), in addition to the amount thereof. This is why the usefulness of the method according to the invention is more evident in this second, more real case.

Figure 10:
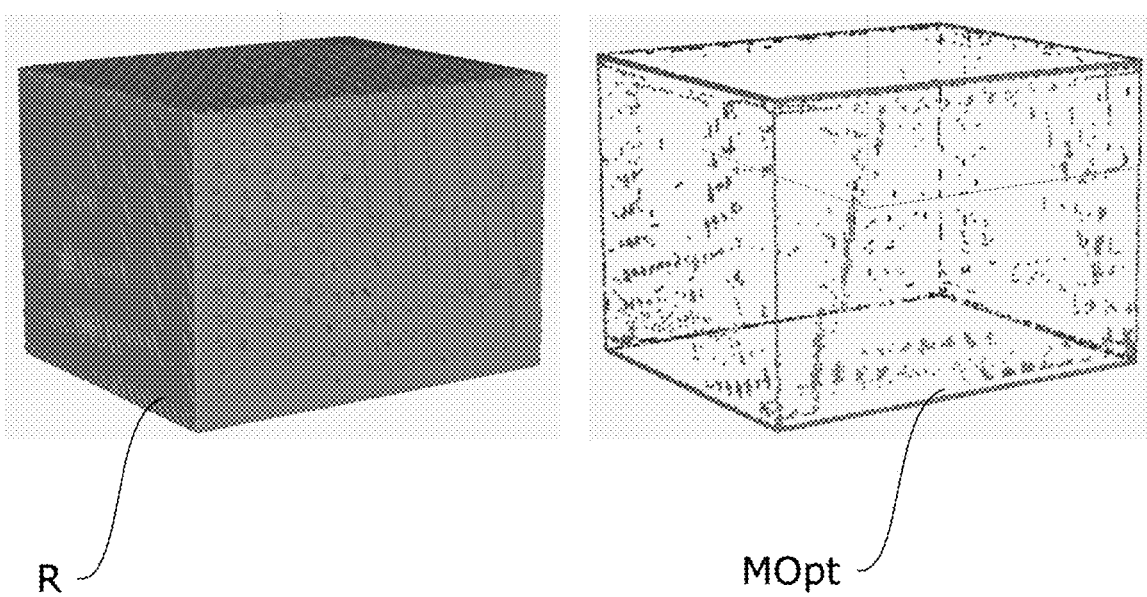
FIG. 10 This figure shows on the left the second numerical model resulting from carrying out the reconstruction by means of silhouettes of a prism having upper and lower rectangular bases, and on the right the third model can be observed, wherein the selected points are concentrated along the edges of the prism removing points from the central area of the faces of the prism.

FIG. 10 shows on the left the second numerical model (R) resulting from carrying out the reconstruction by means of silhouettes of a prism having upper and lower rectangular bases, wherein there can be observed in the central part projecting pyramids which increase the real volume.

The third model (MOpt) can be observed on the right in the same figure, wherein the selected points are concentrated on the edges of the prism, removing points from the central area of the faces of the prism, and therefore not giving rise to the error generated by prominences of the silhouetting method.

Compared with the first numerical model (MRef), for example by means of a specific metric, this third numerical model (MOpt) allows providing a value of coherence by means of a third pre-established metric which may be different from the first metric and the second metric. In this embodiment, the third metric used was also the Euclidean metric.

The invention claimed is:

1. A method of determining the coherence between a physical object and a numerical model representative of the shape of a physical object,
   wherein the method comprises:
   a) providing, by one or more processors, a first numerical model, wherein said first numerical model is a numerical model representative of the shape of a physical object;
   b) instructing, by the one or more processors, means for positioning the physical object to position the physical object in a common capture region;
   c) instructing, by the one or more processors, a plurality of cameras to capture an image of the physical object by means of each of said cameras, wherein:
      each camera comprises a sensor and a lens for focusing an image on the sensor, such that the lens is configured with a focal point that is pre-established and positioned on an optical axis of the lens, and
      each camera of the plurality of cameras are spatially distributed such that an optical axes for each camera of the plurality of cameras is oriented towards a capture region;
   d) generating, by the one or more processors, a second numerical model of the object (R) from the plurality of captured images and by means of a silhouette technique;
   e) aligning, by the one or more processors, the first numerical model and the second numerical model in a computational space;
   f) generating, by the one or more processors based on a plurality of optimal points, a third numerical model, wherein each of the plurality of optimal points is the result of a selection from a plurality of points wherein:
      the plurality of points with respect to which the selection is made belongs to a conical surface demarcating a conical volume, and
      the selected optimal point or points meet a pre-established condition of proximity with a surface of the volume of the first model;
   g) providing, by the one or more processors based on a pre-established metric, a measurement value of coherence by taking a measurement between the third numerical model and the first numerical model;
   wherein steps a) and b) can be carried out in any order.

2. The method of claim 1, wherein the second numerical model is generated from the plurality of captured images such that the second numerical model of the object numerically represents a volume (V) in the computational space,
   wherein $V = \bigcap_{i=1}^{N} Cn_i$, and
   wherein $Cn_i$ is the conical volume defined with the vertex in the point in space where the focal point of one of the plurality of cameras is positioned and demarcated by a ruled surface formed by connecting lines which connect the focal point of the camera and each point in space of the sensor corresponding to a silhouette of the physical object represented in the image captured by said sensor.

3. The method of claim 2, wherein selecting the plurality of points when generating the third numerical model is determined, for each sensor, according to the following steps:
determining, by the one or more processors, one or more line segments belonging to a line passing through the focal point of the sensor, wherein the one or more line segments are at least contained in a portion of the demarcating conical surface of the conical volume;
for each of the one or more line segments, selecting, by the one or more processors, the plurality of points of each line segment which belong to the demarcating surface of the volume.

4. The method of claim 1, wherein the condition of proximity to be applied on a plurality of points for determining those which are optimal points in the generation of the third numerical model is determined by selecting that point or those points which meet the condition of minimum distance to the surface of the first numerical model.

5. The method of claim 1, wherein the third numerical model is generated by making a selection of optimal points from a plurality of points determined for each of the sensors.

6. The method of claim 1, wherein each camera of the plurality of cameras is evenly distributed according to a spherical surface, and wherein the common capture region is located in a center of said spherical surface.

7. The method of claim 1, wherein for a plurality of first different reference numerical models, steps a) and e) to g) are carried out for each of the plurality of first numerical models and the third numerical model by establishing the first numerical model verifying the best measurement of coherence in step g) and by determining that the first numerical model is the one having the greatest coherence with respect to the physical object.

8. A device for determining the coherence between a physical object and a numerical model representative of the shape of a physical object comprising:
a plurality of cameras,
wherein each camera of the plurality of cameras comprises a sensor and a lens for focusing an image on the sensor, such that the lens is configured with a focal point that is pre-established and positioned on an optical axis of the lens, and wherein each camera of the plurality of cameras are spatially distributed such that the optical axes of each of the plurality cameras are oriented towards a capture region;
means for positioning the physical object in a common capture region;
one or more processors in communication with at least the plurality of cameras and the means for positioning the physical object (O),
wherein the one or more processors are configured to:
a) provide a first numerical model, wherein said first numerical model is a numerical model representative of the shape of a physical object;
b) order instruct the means for positioning the physical object to position the physical object in the common capture region;
c) instruct the plurality of cameras to capture an image of the physical object by means of each of said cameras;
d) generate a second numerical model of the object from the plurality of captured images and by means of a silhouette technique;
e) align the first numerical model and the second numerical model in a computational space;
f) generate, based on a plurality of optimal points, a third numerical model, wherein each of the plurality of optimal points is the result of a selection from a plurality of points wherein:
the plurality of points with respect to which the selection is made belongs to a conical surface demarcating a conical volume, and
the selected optimal point or points meet a pre-established condition of proximity with a surface of the volume of the first model;
g) provide, based on a pre-established metric, a measurement value of coherence by taking a measurement between the third numerical model and the first numerical model;
wherein steps a) and b) can be carried out in any order.

9. The device of claim 8, wherein the second numerical model is generated from the plurality of captured images such that the second numerical model of the object numerically represents a volume (V) in the computational space, wherein $V = \cap_{i=1}^{N} Cn_i$, and
wherein $Cn_i$ is the conical volume defined with the vertex in the point in space where the focal point of one of the plurality of cameras is positioned and demarcated by a ruled surface formed by connecting lines which connect the focal point of the camera and each point in space of the sensor corresponding to a silhouette of the physical object represented in the image captured by said sensor.

10. The device of claim 9, wherein when selecting the plurality of points when the generation of the third numerical model, the one or more processors are configured to, for each sensor:
determine one or more line segments belonging to a line passing through the focal point of the sensor, wherein the one or more line segments are at least contained in a portion of the demarcating conical surface of the conical volume;
for each of the one or more line segments, select the plurality of points of each line segment which belong to the demarcating surface of the volume.

11. The device of claim 8, wherein the condition of proximity to be applied on a plurality of points for determining those which are optimal points in the generation of the third numerical model is determined by selecting that point or those points which meet the condition of minimum distance to the surface of the first numerical model.

12. The device of claim 8, wherein the third numerical model is generated by making a selection of optimal points from a plurality of points determined for each of the sensors.

13. The device of claim 8, wherein each camera of the plurality of cameras is evenly distributed according to a spherical surface, and wherein the common capture region is located in a center of said spherical surface.

14. The device of claim 8, wherein for a plurality of first different reference numerical models, steps a) and e) to g) are carried out for each of the plurality of first numerical models and the third numerical model by establishing the first numerical model verifying the best measurement of coherence in step g) and by determining that the first numerical model is the one having the greatest coherence with respect to the physical object.

15. A non-transitory computer readable medium storing instructions, which when executed by one or more processors, cause the one or more processors to
 a) provide a first numerical model, wherein said first numerical model is a numerical model representative of the shape of a physical object;
 b) instruct the means for positioning the physical object to position the physical object in a common capture region;
 c) instruct a plurality of cameras to capture an image of the physical object by means of each of said cameras, wherein each camera of the plurality of cameras comprises a sensor and a lens for focusing an image on the sensor, such that the lens is configured with a focal point that is pre-established and positioned on an optical axis of the lens, and
  wherein each camera of the plurality of cameras are spatially distributed such that the optical axes of each of the plurality cameras are oriented towards a capture region;
 d) generate a second numerical model of the object from the plurality of captured images and by means of a silhouette technique;
 e) align the first numerical model and the second numerical model in a computational space;
 f) generate, based on a plurality of optimal points, a third numerical model, wherein each of the plurality of optimal points is the result of a selection from a plurality of points wherein:
  the plurality of points with respect to which the selection is made belongs to a conical surface demarcating a conical volume, and
  the selected optimal point or points meet a pre-established condition of proximity with a surface of the volume of the first model;
 g) provide, based on a pre-established metric, a measurement value of coherence by taking a measurement between the third numerical model and the first numerical model;
 wherein steps a) and b) can be carried out in any order.

16. The non-transitory computer readable medium of claim 15, wherein the second numerical model is generated from the plurality of captured images such that the second numerical model of the object numerically represents a volume (V) in the computational space,
 wherein $V=\bigcap_{i=1}^{N} Cn_i$, and
 wherein $Cn_i$ is the conical volume defined with the vertex in the point in space where the focal point of one of the plurality of cameras is positioned and demarcated by a ruled surface formed by connecting lines which connect the focal point of the camera and each point in space of the sensor corresponding to a silhouette of the physical object represented in the image captured by said sensor.

17. The non-transitory computer readable medium of claim 16, wherein when selecting the plurality of points when the generation of the third numerical model, causes the one or more processors, for each sensor:
 determine one or more line segments belonging to a line passing through the focal point of the sensor, wherein the one or more line segments are at least contained in a portion of the demarcating conical surface of the conical volume;
 for each of the one or more line segments, select the plurality of points of each line segment which belong to the demarcating surface of the volume.

18. The non-transitory computer readable medium of claim 15, wherein the condition of proximity to be applied on a plurality of points for determining those which are optimal points in the generation of the third numerical model is determined by selecting that point or those points which meet the condition of minimum distance to the surface of the first numerical model.

19. The non-transitory computer readable medium of claim 15, wherein the third numerical model is generated by making a selection of optimal points from a plurality of points determined for each of the sensors.

20. The non-transitory computer readable medium of claim 15, wherein each camera of the plurality of cameras is evenly distributed according to a spherical surface, and wherein the common capture region is located in a center of said spherical surface.

* * * * *